United States Patent [19]

Kurabayashi et al.

[11] Patent Number: 5,142,451
[45] Date of Patent: Aug. 25, 1992

[54] ELECTRIC DOUBLE LAYER CAPACITOR

[75] Inventors: Ken Kurabayashi, Chigasaki; Yoshinobu Tsuchiya, Fujisawa, both of Japan

[73] Assignee: Isuzu Motors Limited, Tokyo, Japan

[21] Appl. No.: 573,693

[22] Filed: Aug. 28, 1990

[30] Foreign Application Priority Data

Sep. 12, 1989 [JP] Japan .................... 1-236510

[51] Int. Cl.⁵ .............................. H01G 9/00
[52] U.S. Cl. .................................... 361/502
[58] Field of Search ............... 361/502, 523, 524, 504

[56] References Cited

FOREIGN PATENT DOCUMENTS 086112  11/1988  European Pat. Off. .
2009550  2/1970  France .
101619  4/1989  Japan .

OTHER PUBLICATIONS

Electronic Design vol. 30, No. 20, Sep. 1982, pp. 159–164.

Primary Examiner—Donald A. Griffin
Attorney, Agent, or Firm—Staas & Halsey

[57] ABSTRACT

An electric double layer capacitor has two polarized electrodes each comprising a plurality of thin plate-like electrode elements each composed of a porous sintered body, and two current collectors bonded to surfaces of the electrode elements of the polarized electrodes.

5 Claims, 2 Drawing Sheets

ELECTRIC DOUBLE LAYER CAPACITOR

BACKGROUND OF THE INVENTION

The present invention relates to an electric double layer capacitor of high electrostatic capacitance which utilizes the principles of an electric double layer.

Recently, high-capacitance capacitors based on the electric double layer principles have been developed as backup power supplies for memories in electronic systems, and are widely used with microcomputers and IC memories.

One type of electric double layer capacitor is disclosed in U.S. Pat. No. 3,536,963, for example. FIG. 5 of the accompanying drawings shows the structure of the disclosed electric double layer capacitor. The electric double layer capacitor comprises a single basic cell composed of a pair of current collectors 30 of an electron conductor which serves as a pair of collector electrodes, a pair of carbon electrodes 20 made of activated carbon particles, a nonconductive gasket 10, and a separator 40 positioned between the carbon electrodes 20 for preventing electrons from moving between the electrodes 20. The carbon electrodes 20 are made as paste electrodes from a concentrated slurry which is a mixture of powdery or particulate activated carbon and an electrolyte. The electrolyte has three functions to perform. It serves as a promoter of ion conductivity, an ion source, and a binder for the carbon particles.

It is important that the internal resistance of an electric double layer capacitor be low. The internal resistance of an electric double layer capacitor is greatly affected by the contact resistance of active carbon of the polarized electrodes and the contact resistance between the collector electrodes and the polarized electrodes.

Therefore, in order to reduce the internal resistance of the polarized electrodes and the contact resistance between the collector and polarized electrodes, each basic cell should be kept under vertical pressure to bring the particles of the paste activated carbon into good electric contact with each other. Conventional electric double layer capacitors require each cell to be kept under a pressure of about 100 kg/cm$^2$ though it depends on the size of the electrodes, the size of the particles of the carbon material, or the kind of the electrolyte used. In prior electric double layer capacitors, the cells are kept under pressure by deforming the outer cases of the capacitors or bonding the current collectors strongly to gaskets. If an electric double layer capacitor is to be used as a large-capacitance capacitor, e.g., a power supply for energizing a motor, then it is necessary to increase the cross-sectional areas of the electrodes of the basic cell. Therefore, the pressure to be applied to the basic cell has to be increased. Increasing the pressure, however, causes some practical problems such as the selection of mean for applying the pressure and the need for high rigidity for the outer cell which houses the basic cell.

To solve the above problems, the applicant has proposed an electric double layer capacitor having polarized electrodes each in the form of a porous sintered body and current collectors each made of an electrically conductive material which are composed of electrically conductive fine particles mixed in a base, the current collectors being attached to one surface of the polarized electrodes and entering pores of the polarized electrodes (see Japanese patent application No. 1(1989)-232243. Since the polarized electrodes are constructed as thin plates of porous sintered bodies, the electric double layer capacitor is of a small internal resistance. If the electrodes are increased in size for a higher electrostatic capacitance, then the mechanical strength thereof is reduced because the porous sintered bodies are low in density, and hence the electrodes are liable to be broken when subjected to external bending or torsional loads. Production of large-size sintered electrodes requires expensive dies, and hence is problematic with respect to cost.

SUMMARY OF THE INVENTION

It is an object of the present invention to provide an electric double layer capacitor having an electric double layer composed of an interface between polarized electrodes and an electrolyte, the electric double layer capacitor having a reduced internal resistance of the polarized electrodes and a reduced contact resistance between collector and polarized electrodes, being arranged to prevent the electrodes from being damaged, and being manufactured inexpensively.

According to the present invention, there is provided an electric double layer capacitor having an electric double layer composed of an interface between polarized electrodes and an electrolyte, comprising at least two polarized electrodes each comprising a plurality of thin plate-like electrode elements each composed of a porous sintered body, the polarized electrodes having surfaces disposed out of contact with each other in confronting relationship, two current collectors bonded to other surfaces of the electrode elements, and a gasket disposed between the current collectors and surrounding the polarized electrodes, the gasket being joined to peripheral edges of the current collectors.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
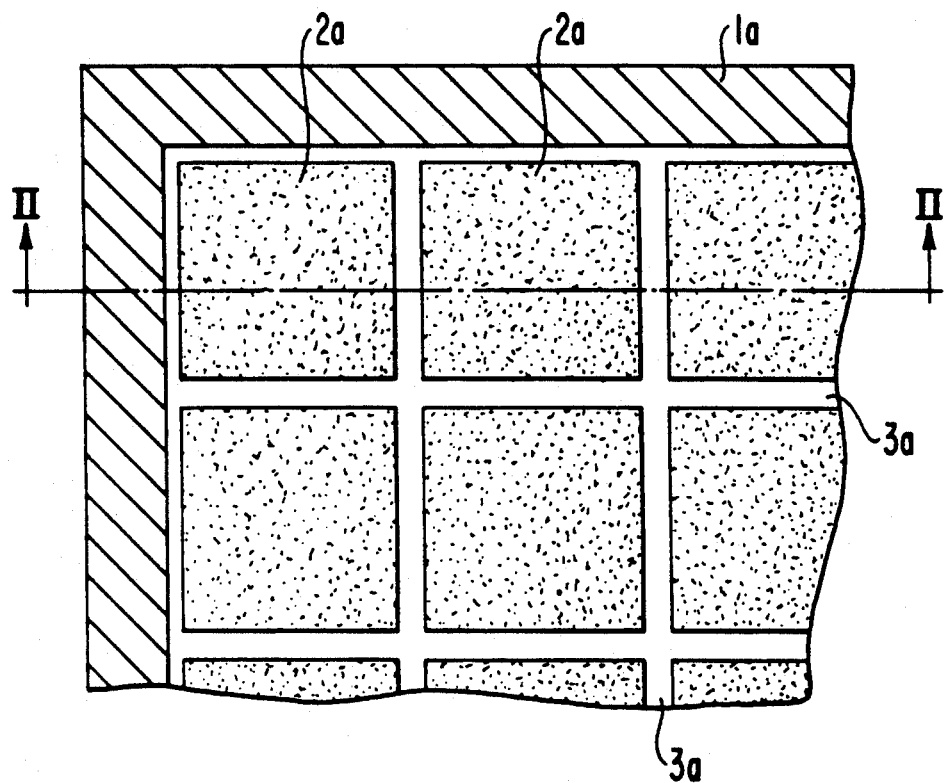
FIG. 1 is a fragmentary cross-sectional view of an electric double layer capacitor according to an embodiment of the present invention.
Figure 2:
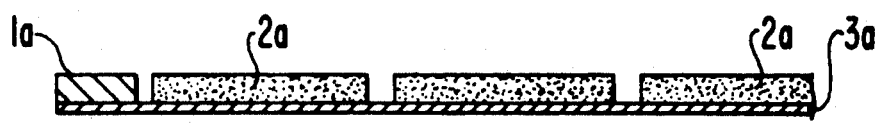
FIG. 2 is a cross-sectional view taken along line II—II of FIG. 1.
Figure 3:
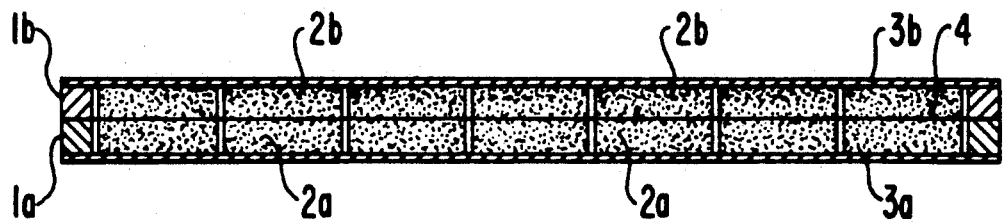
FIG. 3 is a cross-sectional view of the electric double layer capacitor.

As shown in FIGS. 1, 2, and 3, an electric double layer capacitor comprises a pair of gaskets 1a, 1b each made of an insulating material and having a suitable width, the gaskets 1a, 1b surrounding the entire periphery of a square configuration.

The electric double layer capacitor has a plurality of thin plate-like square electrode elements 2a each in the form of a porous sintered body which is made of fine particles of activated carbon by firing or plasma spraying, the electrode elements 2a serving as a first polarized electrode. Since the activated carbon particles are joined together by sintering in each of the electrode elements 2a, the internal resistance of the electrode elements 2a is of a low internal resistance. The electrode elements 2a have a wide surface area as they are porous in nature. The electrode elements 2a are impregnated with an electrolyte.

The electric double layer capacitor also has a plurality of thin plate-like square electrode elements 2b each in the form of a porous sintered body which is made of fine particles of activated carbon by firing or plasma spraying, the electrode elements 2b serving as a second polarized electrode. The electrode elements 2a and the electrode elements 2b have confronting surfaces held out of contact with each other. The opposite surfaces of the electrode elements 2a, 2b are held in contact with current collectors 3a, 3b, respectively, and are electrically connected together. Each of the current collectors 3a, 3b is fabricated as follows: Electrically conductive fine particles are mixed into unvulcanized rubber as a base, and the mixture is attached to the electrode elements by hot curing. The material of the current collectors thus enters the pores of the porous electrode elements, and the peripheral edges of the current collectors are secured in tight intimate contact with the entire circumferential edges of the gaskets 1a, 1b.

Between the first polarized electrode which is composed of the electrode elements 2a and the second polarized electrode which is composed of the electrode elements 2b, there is interposed a separator 4 made of nonwoven fabric such as of polypropylene, for keeping the electrode elements 2a, 2b out of contact with each other thereby to prevent electrons from moving between the electrode elements while allowing ions to move therebetween. The separator 4 is positioned between the polarized electrodes when assemblies of the electrode elements and the current collectors are superposed on each other, and the outer periphery of the separator 4 is firmly bonded to the gaskets 1a, 1b.

Since the electrode elements 2a, 2b which constitute the polarized electrodes are made as thin plate-like porous sintered bodies, electric charges stored by the activated carbon of the electrode elements are collected by the current collectors 3a, 3b through paths of a low internal resistance. Therefore, the electric double layer capacitor is of a low internal resistance. The polarized electrodes are constructed of the electrode elements 2a, 2b which are connected parallel to the current collectors 3a, 3b, electric charges stored by the electrode elements are combined together though these electric charges are individually small in level. As a consequence, the electric double layer capacitor is of a high electrostatic capacitance. Since the electrode elements 2a, 2b of the polarized electrodes are small in size, even when external forces are applied to the capacitor, any deformation or strain of the capacitor is small and any stresses applied to the capacitor are scattered and distributed. Consequently, the capacitor is prevented from being damaged by undue external forces.

Figure 4:
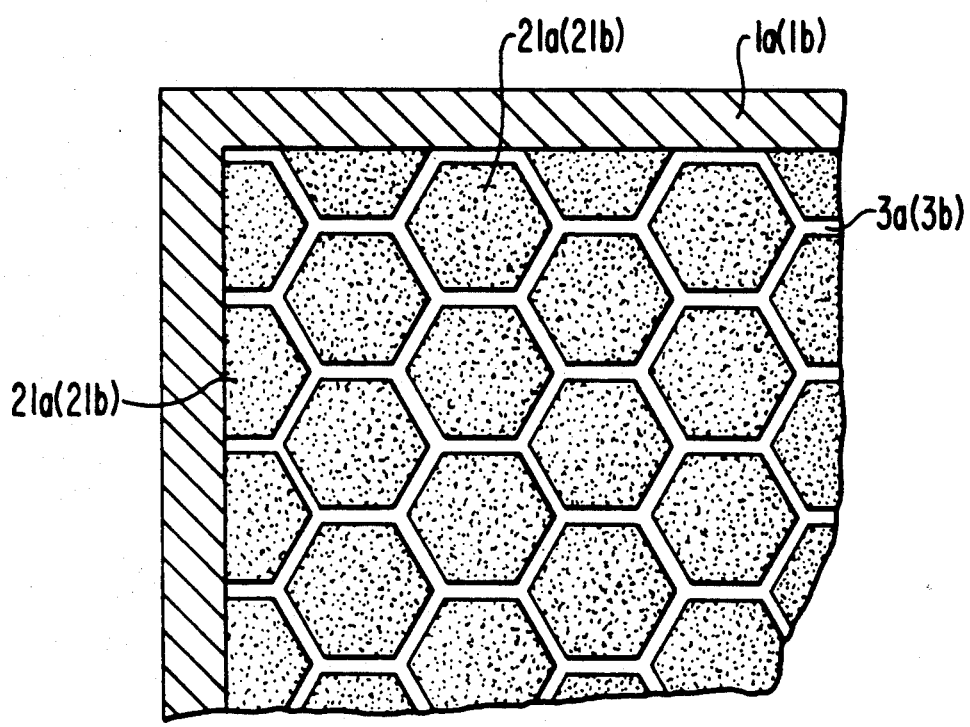
FIG. 4 is a fragmentary cross-sectional view of an electric double layer capacitor according to another embodiment of the present invention.
Figure 5:
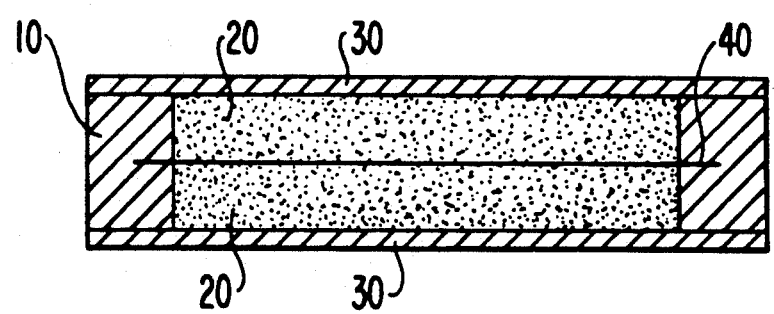
FIG. 5 is a cross-sectional view of a conventional electric double layer capacitor.

FIG. 4 fragmentarily shows an electric double layer capacitor according to another embodiment of the present invention. Those parts shown in FIG. 4 which are identical to those shown in FIGS. 1 through 3 are denoted by identical reference numerals, and will not be described in detail below. In the embodiment shown in FIG. 4, electrode elements 21 a (21b) each in the form of a porous sintered body made of activated carbon and serving as a polarized electrode are shaped in a honeycomb construction. The electrode elements 21a (21b) are spaced with small gaps therebetween, and bonded to the current collectors 3a (3b). The electrode elements 21a (21b) are accommodated in the gasket 1a (1b). The electrode elements are impregnated with an electrolyte, and two structures are superposed and bonded to each other with a separator interposed therebetween, thereby completing an electric double layer capacitor.

Although certain preferred embodiments have been shown and described, it should be understood that many changes and modifications may be made therein without departing from the scope of the appended claims.

What is claimed is:

1. An electric double layer capacitor having an electric double layer composed of an interface between polarized electrodes and an electrolyte, comprising:
    at least two polarized electrodes each comprising a plurality of thin plate-like electrode elements each composed of a porous sintered body, said polarized electrodes having surfaces disposed out of contact with each other in confronting relationship;
    two current collectors bonded to other surfaces of said electrode elements; and
    a gasket disposed between said current collectors and surrounding said polarized electrodes, said gasket being joined to peripheral edges of said current collectors.

2. An electric double layer capacitor according to claim 1, wherein each of said electrode elements is of a square shape.

3. An electric double layer capacitor according to claim 1, wherein said electrode elements are arranged in a honeycomb construction.

4. An electric double layer capacitor according to claim 1, wherein each of said current collectors comprises a base of unvulcanized rubber with electrically conductive fine particles mixed therein, said current collectors being secured to said electrode elements by hot curing the unvulcanized rubber.

5. An electric double layer capacitor according to claim 1, further comprising a separator interposed between said polarized electrodes, for preventing electrons from moving between said polarized electrodes while allowing ions to move therebetween.

* * * * *